(12) United States Patent
Fujibayashi

(10) Patent No.: US 9,058,073 B2
(45) Date of Patent: Jun. 16, 2015

(54) ELECTRONIC DEVICE AND ADJUSTMENT METHOD FOR ADJUSTING SETTING VALUE

(75) Inventor: Toshihiko Fujibayashi, Tokyo (JP)

(73) Assignee: Lenovo Innovations Limited, Quarry Bay (HK)

( * ) Notice: Subject to any disclaimer, the term of this patent is extended or adjusted under 35 U.S.C. 154(b) by 68 days.

(21) Appl. No.: 13/704,219

(22) PCT Filed: Apr. 15, 2011

(86) PCT No.: PCT/JP2011/059365
§ 371 (c)(1),
(2), (4) Date: Dec. 13, 2012

(87) PCT Pub. No.: WO2011/158549
PCT Pub. Date: Dec. 22, 2011

(65) Prior Publication Data
US 2013/0093709 A1    Apr. 18, 2013

(30) Foreign Application Priority Data
Jun. 17, 2010    (JP) ................................. 2010-138707

(51) Int. Cl.
*G06F 3/041*    (2006.01)
*G06F 3/0484*    (2013.01)
*G06F 3/0488*    (2013.01)

(52) U.S. Cl.
CPC ............ *G06F 3/041* (2013.01); *G06F 3/04847* (2013.01); *G06F 3/0488* (2013.01)

(58) Field of Classification Search
CPC .... G06F 3/04847; G06F 3/0488; G06F 3/041
USPC .................... 178/18.01–19.07; 345/173–178; 715/786, 833
See application file for complete search history.

(56) References Cited

U.S. PATENT DOCUMENTS 6,867,764 B2 *  3/2005  Ludtke ......................... 345/173
6,922,816 B1    7/2005  Amin et al.
(Continued)

FOREIGN PATENT DOCUMENTS

JP          3082855       10/2001
JP       2005-244360 A     9/2005
(Continued)

OTHER PUBLICATIONS

European Search Report dated Apr. 2, 2014.
International Patent Application Publication No. PCT/JP2011/059365 dated Jul. 26, 2011 (English Translation Thereof).

*Primary Examiner* — Michael Pervan

(57) ABSTRACT

An electronic device that can solve a problem in which fine adjustment for a setting value requires much effort is provided. Display and input control section 102 displays slide bar 107 used to adjust a setting value on display screen 106 and detects a touch position at which a touch operation has been performed on display screen 106. Control section 104 detects a first operation that is a drag operation performed in a horizontal direction of slide bar 107 based on the touch position detected by display and input control section 102 and a second operation that is performed for slide bar 107, the second operation being different from said first operation. Slide bar control section 105 changes the setting value based on a horizontal moving distance that is a moving distance of the touch position of said first operation and base on contents of said second operation.

11 Claims, 6 Drawing Sheets

(56) References Cited

U.S. PATENT DOCUMENTS

| | | |
|---|---|---|
| 2009/0282362 A1 | 11/2009 | Matsumoto |
| 2010/0039400 A1 | 2/2010 | Jang |
| 2010/0058228 A1* | 3/2010 | Park .............................. 715/786 |
| 2010/0231534 A1* | 9/2010 | Chaudhri et al. .............. 345/173 |

FOREIGN PATENT DOCUMENTS

| | | |
|---|---|---|
| JP | 2008-048105 A | 2/2008 |
| JP | 3145773 | 10/2008 |
| JP | 2009-230468 A | 10/2009 |
| JP | 2009-295147 A | 12/2009 |

* cited by examiner

ELECTRONIC DEVICE AND ADJUSTMENT METHOD FOR ADJUSTING SETTING VALUE

TECHNICAL FIELD

The present invention relates to an electronic device such as a portable telephone device and an adjustment method for its setting value, in particular, to a touch panel type electronic device and an adjustment method for its setting value.

BACKGROUND ART

In recent years, as electronic devices such as portable telephone devices, devices having a touch panel in which an input device and a display device are integrated have become common. Some of these electronic devices display a slide bar used to adjust a setting value for a playback start time and a sound volume of music data.

The slide bar has a bar and a knob. The bar indicates the adjustable range of a setting value, whereas the knob is slidable along the bar and indicates the setting value as the position on the bar. The user can adjust the setting value by touching the knob on the display screen with his or her finger and by performing a drag operation that moves the finger while it is touching the display screen.

However, since the length of the bar is restricted by the size of the display screen, if there are many selectable values as a setting value, the intervals of positions that represent selectable values become short. Thus, the change rate of the setting value that corresponds to the moving distance of the finger that performs the drag operation becomes large. As a result, even if the user slightly moves his or her finger, the setting value largely changes. Consequently, it becomes difficult to finely adjust the setting value.

In contrast, Patent Literature 1 describes an information processing device that adjusts a setting value using two slide bars. In this information processing device, when the user performs a predetermined operation while a first slide bar that indicates an adjustable range of the setting value is being displayed, a second slide bar that is different from the first slide bar is displayed.

The range represented by the second slide bar is part of the range represented by the first slide bar. Thus, if the length of the first slide bar is nearly the same as that of the second slide bar, the change rate of the setting value corresponding to the moving distance of the finger on the second slide bar is smaller than the change rate of the setting value that corresponds to the moving distance of the finger on the first slide bar. As a result, while the user can coarsely adjust the setting value using the first slide bar, he or she can finely adjust the setting value using the second slide bar.

RELATED ART LITERATURE

Patent Literature

Patent Literature 1: JP2009-295147A, Publication

SUMMARY OF THE INVENTION

Problem to be Solved by the Invention

When the user finely adjusts the setting value on the information processing device described in Patent Literature 1, he or she needs to perform a predetermined operation while the first slide bar is being displayed so as to cause a second slide bar that is different from the first slide bar to be displayed and then operate the second slide bar. Thus, the information processing device according to Patent Literature 1 imposes much effort on the user.

An object of the present invention is to provide an electronic device and an adjustment method for its setting value that can solve the foregoing problem in which fine adjustment for the setting value requires much effort.

Means that Solve the Problem

An electronic device according to the present invention is an electronic device including a display and input section that has a display screen and that accepts a touch operation for said display screen; a display and input control section that displays a slide bar used to adjust a setting value on said display screen and that detects a touch position at which said touch operation has been performed on said display screen; a control section that detects a first operation that is a drag operation performed along said slide bar based on the touch position detected by said display and input control section and a second operation that is performed on said display screen, the second operation being different from said first operation; and a slide bar control section that changes said setting value based on a horizontal moving distance that is a moving distance of said touch position of said first operation and based on contents of said second operation.

An adjustment method for a setting value according to the present invention is an adjustment method for a setting value for an electronic device having a display screen, including displaying a slide bar used to adjust the setting value on said display screen; detecting a touch position at which said touch operation has been performed on said display screen; detecting a first operation that is a drag operation performed along said slide bar on said display screen based on said touch position and a second operation that is performed on said slide bar, the second operation being different from said first operation; and changing said setting value based on a horizontal moving distance that is a moving distance of said touch position of said first operation and based on contents of said second operation.

Effect of the Invention

According to the present invention, effort that is imposed on a user who finely adjusts the setting value can be reduced.

BEST MODES THAT CARRY OUT THE INVENTION

Figure 1:
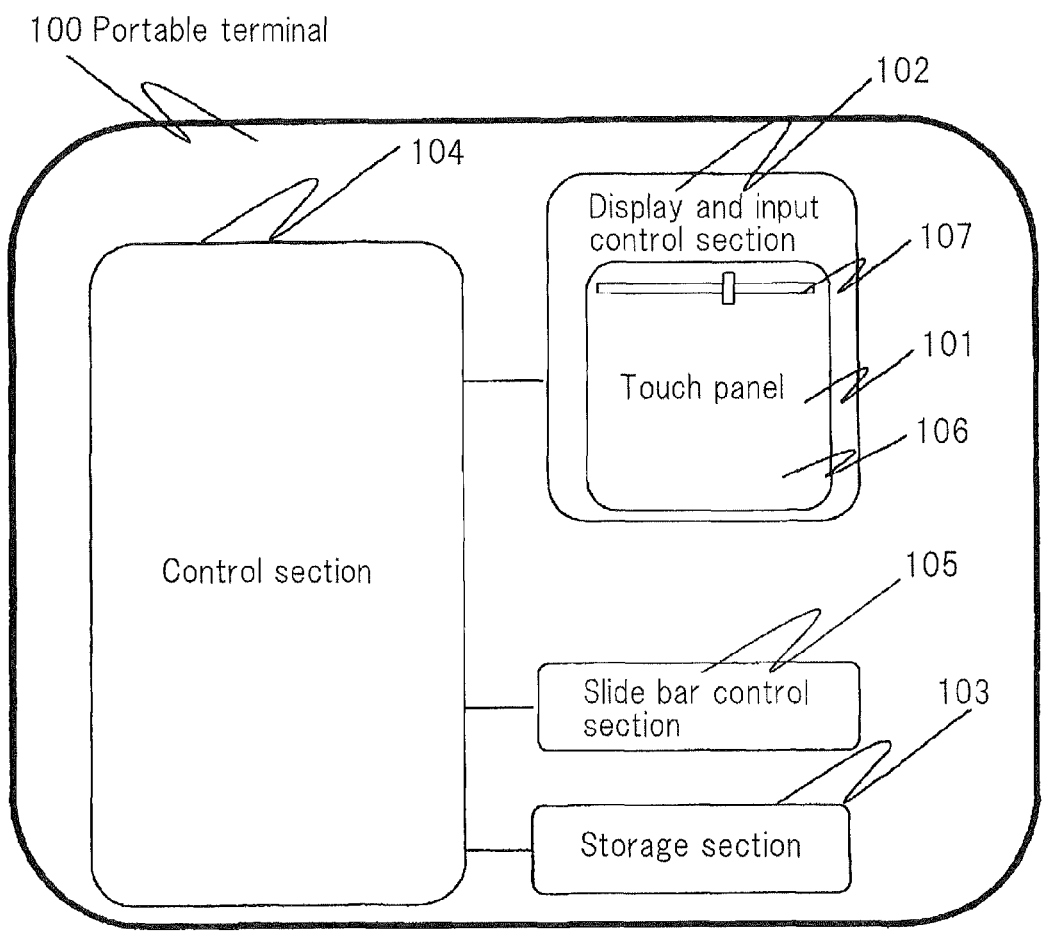
FIG. 1 is a block diagram showing the structure of a portable terminal according to a first embodiment of the present invention.

Next, with reference to the accompanying drawings, embodiments of the present invention will be described. In the following description, portions having similar functions are denoted by similar reference numerals and their redundant description may be omitted.

FIG. 1 is a block diagram showing the structure of a portable terminal that is an electronic device according to a first embodiment of the present invention. In FIG. 1, portable terminal 100 has touch panel 101, display and input control section 102, storage section 103, control section 104, and slide bar control section 105.

Touch panel 101 is a display and input section that has display screen 106 that displays various types of information and that accepts a touch operation for display screen 106. According to the present invention, the number of display screens is not specified. In this embodiment, it is assumed that touch panel 101 has one display screen.

Display and input control section 102 accepts display information that depicts a slide bar that is used to adjust a setting value from slide bar control section 105 through control section 104 and then displays slide bar 107 on display screen 106 based on the display information. The setting value may be any value that the user can change such as playback start time and sound volume of music data and brightness of display screen 106.

Figure 2:
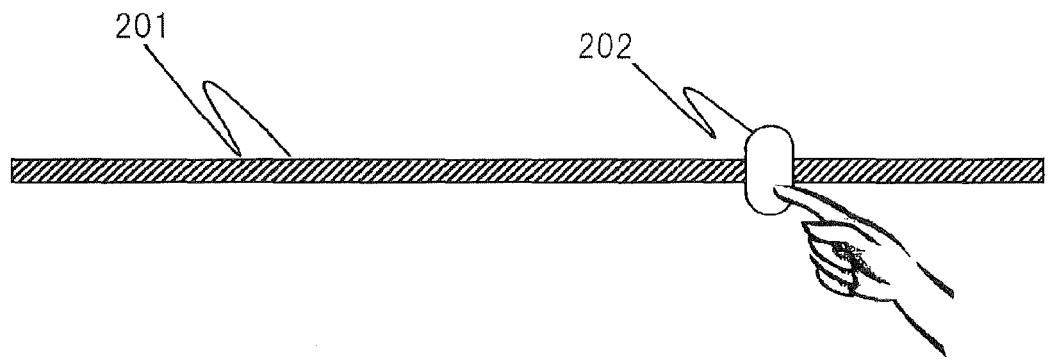
FIG. 2 is a schematic diagram showing an example of a slide bar.

FIG. 2 is a schematic diagram showing an example of slide bar 107. As shown in FIG. 2, slide bar 107 has bar 201 that indicates the adjustable range of the setting value; and knob 202 that moves along bar 201. The position of knob 202 represents the current setting value.

Returning to FIG. 1, display and input control section 102 detects a touch position at which a touch operation has been performed on display screen 106 and notifies control section 104 of the touch position.

Storage section 103 stores the current setting value and the adjustable range of the setting value.

Control section 104 detects predetermined first and second operations performed on display screen 106 based on the touch position of the display and input control section 102 has notified control section 104.

The first operation is a drag operation performed along slide bar 107. When the touch position is moved along slide bar 107, control section 104 detects that the first operation has been performed.

The second operation is not limited as long as it is different from the first operation. The second operation is, for example an operation, that moves the touch position in the normal direction of slide bar 107. According to this embodiment, the second operation is a drag operation performed in the normal direction of the slide bar. When the touch position is moved in the normal direction of the slide bar, control section 104 detects that the second operation has been performed.

Since bar 201 shown in FIG. 2 is formed in a linear shape, the direction along slide bar 107 is the horizontal direction of bar 201, whereas the normal direction of slide bar 107 is the vertical direction of the slide bar. In the following, unless otherwise specified, slide bar 107 is the one shown in FIG. 2. The direction along slide bar 107 is represented as the horizontal direction of slide bar 107, whereas the normal direction of slide bar 107 is represented as the vertical direction of slide bar 107.

Slide bar control section 105 generates display information that depicts slide bar 107 based on the setting value and adjustable range stored in storage section 103 and notifies display and input control section 102 of the generated display information through control section 104. More specifically, the display information represents the length of bar 201, the size of knob 202, the position of knob 202 on bar 201, and so forth.

In addition, based on the first operation and the contents of the second operation detected by control section 104, slide bar control section 105 updates the display information and adjusts the setting value stored in storage section 103.

For example, if the first operation is detected, slide bar control section 105 generates display information in which the position of knob 202 is changed corresponding to the horizontal moving distance of the touch position of the first operation and notifies display and input control section 102 of the generated display information. Thereafter, slide bar control section 105 changes the setting value stored in storage section 103 to the value indicated by the position of knob 202.

If the second operation is detected, slide bar control section 105 generates display information in which the position of knob 202 is changed corresponding to the vertical moving distance of the touch position of the second operation and notifies display and input control section 102 of the changed display information. Thereafter, slide bar control section 105 changes the setting value stored in storage section 103 to the value indicated by the position of knob 202.

Next, slide bar 107 will be described in detail.

When slide bar 107 as shown in FIG. 2 is displayed, the user can intuitively know that the setting value can be adjusted by performing the first operation that drags knob 202 in the horizontal direction of bar 201. However, in this case, it is difficult for the user to intuitively know that the setting value can be also adjusted by dragging knob 202 in the vertical direction of bar 201.

To alleviate such difficulty, slide bar 107 shown in FIG. 2 depicts a bolt and a nut that is placed on the bolt. More specifically, bar 201 depicts hatched lines that resemble the screw threads of a bolt.

When slide bar 107 depicts such a nut and a bolt, they allow the user to imagine that turning the nut causes it to move along the bolt. Thus, the user can intuitively know that when the user drags knob 202 in the vertical direction of bar 201, since knob 202 moves in the horizontal direction of bar 201, he or she can adjust the setting value.

Figure 3:
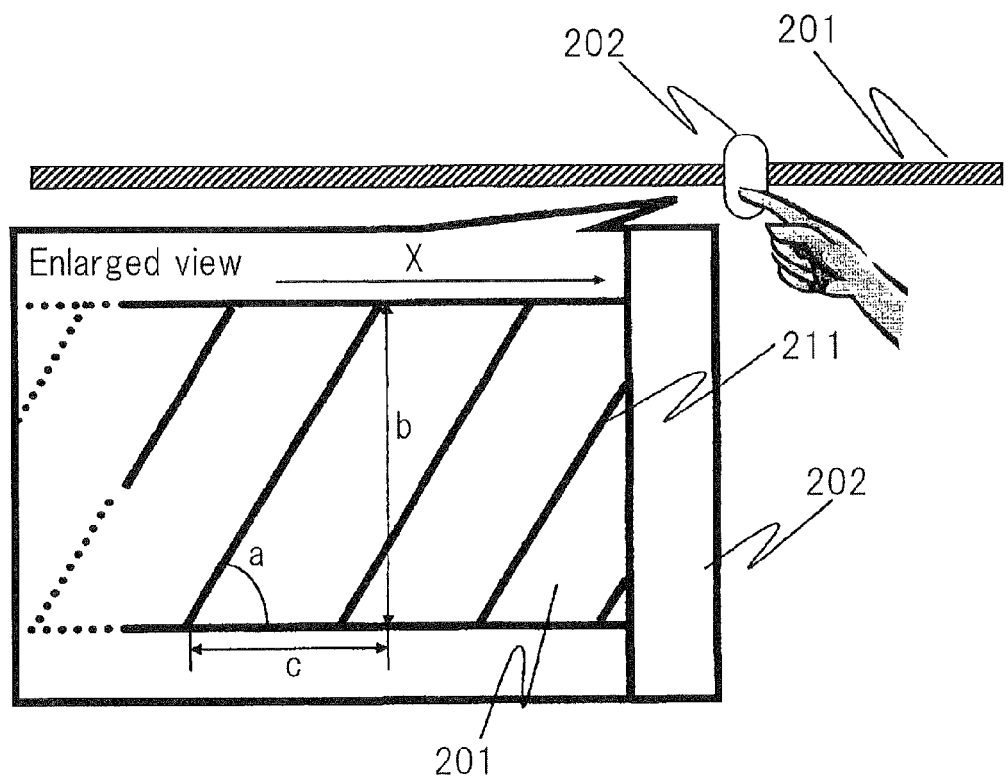
FIG. 3 is an enlarged view showing the neighborhood of a knob of the slide bar.

FIG. 3 is an enlarged view showing the neighborhood of bar 201 of slide bar 107. As shown in FIG. 3, hatched lines 211 of bar 201 are formed at predetermined intervals. In addition, the angle formed by hatched lines 211 and the tangent of slide bar 107 is denoted by a. In the following, the angle formed by hatched lines 211 and the tangent of slide bar 107 may be represented by the slope angle.

In FIG. 3, since bar 201 is formed in a linear shape, the tangent of slide bar 107 is a line parallel with bar 201. The slope angle a, the lengths b in the vertical direction of bar 201 of hatched lines 211, and the length c in the horizontal direction of bar 201 of hatched lines 211 have the relationship of $\tan(a)=b/c$.

In the case of a real bolt and nut, the ratio of the number of rotations of the nut and the moving distance of the nut along the bolt changes depending on the thread angle of the bolt. Like this relationship, if the ratio of the vertical moving distance of the touch position of the second operation and the moving distance of knob 202 is correlated with the slope angle a of hatched lines 211, the user can intuitively know the change amount of the setting value corresponding to the vertical moving distance.

According to this embodiment, the moving distance C of knob 202 can be obtained by C=nB/tan(a)=nBc/b where B is the vertical moving distance and n is any coefficient. In this case, the change rate of the moving distance C of knob 202 corresponding to the vertical moving distance B changes depending on the slope angle a of the hatched lines such that the change rate is reversely proportional to the slope angle a as long as the slope angle a is less than 90 degrees. The user may set the coefficient n and the slope angle a.

In the calculation formula for the moving distance C of knob 202, it is preferred that n·c/b be smaller than 1 where n is the coefficient and a is the slope angle. In this case, the change ratio of the setting value for the vertical moving distance becomes smaller than the change ratio of the setting value for the horizontal moving distance. Thus, the user can finely adjust the setting value by performing a drag operation in the horizontal direction of slide bar 107 and by performing a drag operation in the vertical direction of slide bar 107.

Next, the operation of portable terminal 100 will be described.

Figure 4:
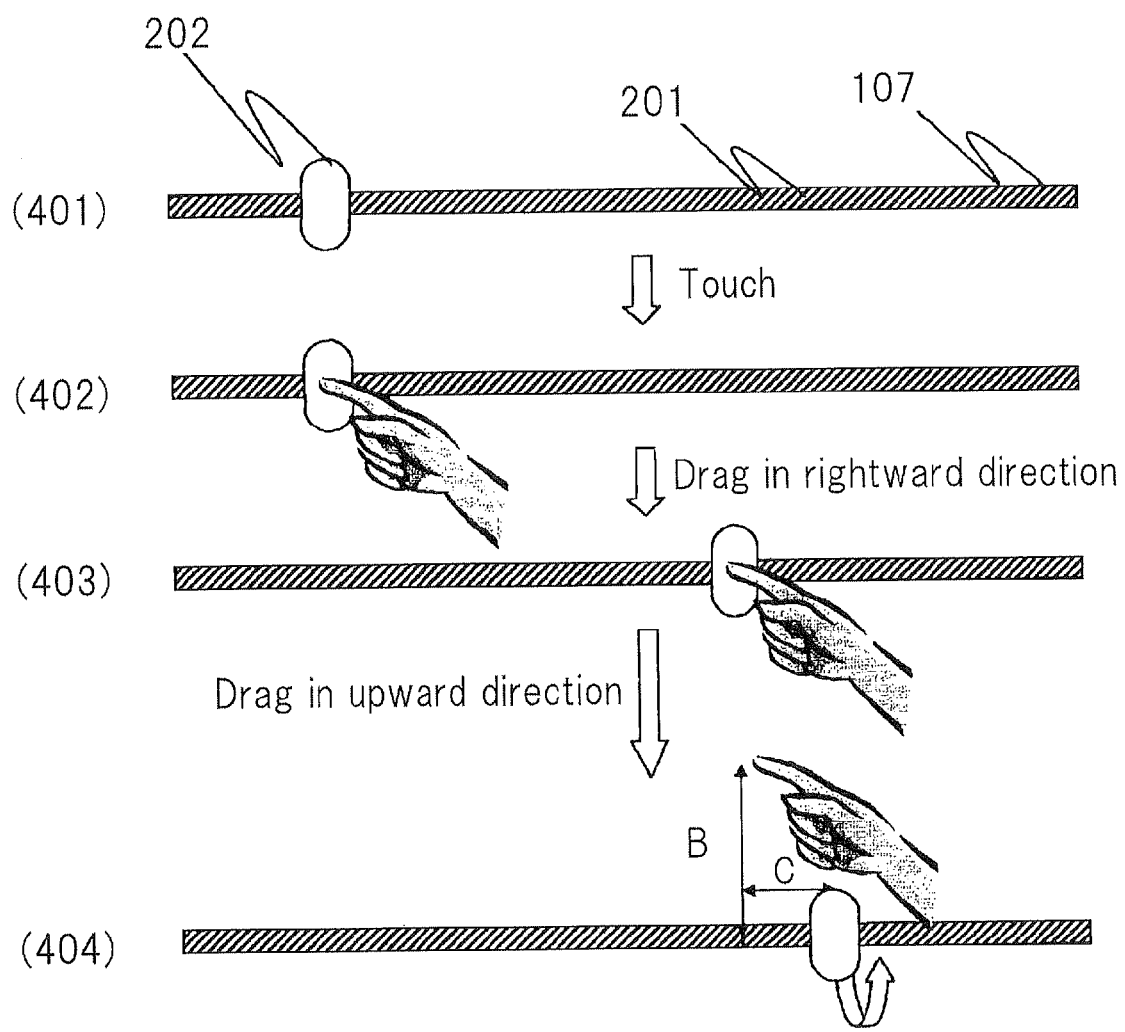
FIG. 4 is a schematic diagram describing an example of the operation of the portable terminal.
Figure 5:
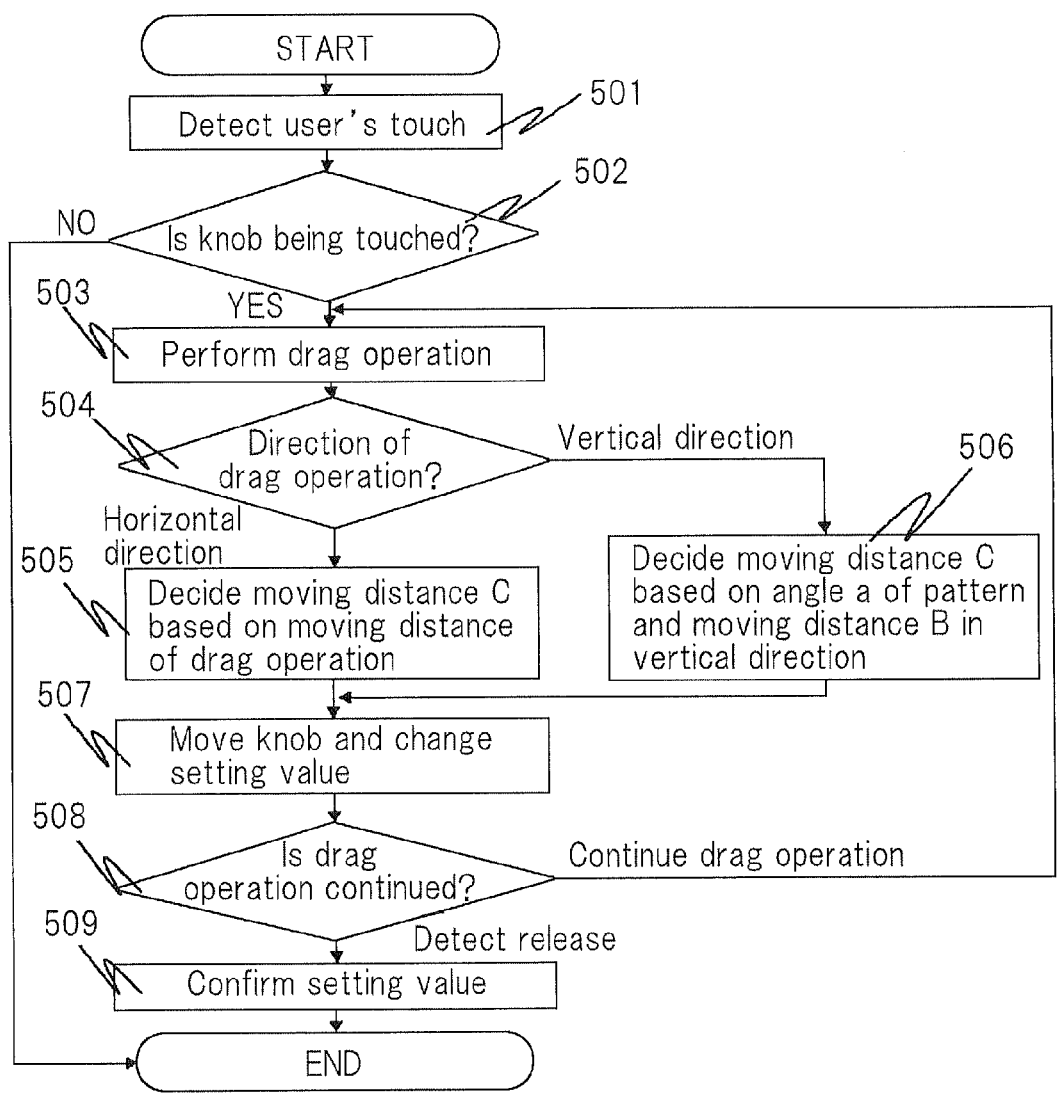
FIG. 5 is a flow chart describing an example of the operation of the portable terminal.

FIG. 4 is a schematic diagram describing the state of the slide bar and the user's operation that adjusts the setting value on portable terminal 100; FIG. 5 is a flow chart showing the flow of the adjustment operation for the setting value on portable terminal 100.

When the user or the like requests adjustment for the setting value, slide bar control section 105 obtains the setting value and adjustable range from storage section 103 through control section 104, generates display information that depicts a slide bar based on the setting value and adjustable range, and notifies display and input control section 102 of the generated display information. Display and input control section 102 displays slide bar 107 on display screen 106 of touch panel 101 based on the notified display information (in state 401).

Thereafter, when the user touches display screen 106, display and input control section 102 detects the touch position and notifies control section 104 of the detected touch position (in step 501).

Control section 104 determines whether or not knob 202 of slide bar 107 is being touched based on the notified touch position. For example, control section 104 identifies the display region of knob 202 based on the display information generated by slide bar control section 105. If the display region contains the touch position, control section 104 determines that knob 202 is being touched. Unless the display region contains the touch position, control section 104 determines that knob 202 is not being touched (in step 502).

If knob 202 is not being touched, control section 104 terminates the process. In contrast, if knob 202 is being touched (in state 402), control section 104 monitors whether or not the touch position of which control section 104 had been notified has been moved. If the touch position has been moved, control section 104 determines that the user has performed a drag operation (in step 503) and checks the moving direction of the touch position (in step 504). If a predetermined period of time has elapsed until the touch position is moved, control section 104 determines that the user does not intend to adjust the setting value and terminates the process.

If the touch position has been moved in the horizontal direction of slide bar 107, control section 104 obtains the moving distance of the touch position as a horizontal moving distance and notifies slide bar control section 105 of the horizontal moving distance. Slide bar control section 105 decides the notified horizontal moving distance as the moving distance of the knob (in step 505).

In contrast, if the touch position has been moved in the vertical direction of slide bar 107, control section 104 obtains the moving distance of the touch position as a vertical moving distance and notifies slide bar control section 105 of the vertical moving distance. Slide bar control section 105 decides the moving distance of knob 202 based on the notified vertical moving distance (in step 506). According to this embodiment, as described above, slide bar control section 105 decides the moving distance C of knob 202 using C=nB/tan(a)=nBc/b. It is assumed that the coefficient n, the slope angle a of hatched lines, the lengths b and c of hatched lines have been stored in storage section 103 and slide bar control section 105 refers to the stored information.

After slide bar control section 105 has decided the moving distance of knob 202 in steps 505 and 506, slide bar control section 105 changes the setting value stored in storage section 103 based on the moving distance of knob 202. In addition, slide bar control section 105 generates display information in which the position of knob 202 was changed and notifies display and input control section 102 of the display information through control section 104. Display and input control section 102 displays slide bar 107 on display screen 106 of touch panel 101 based on the notified display information (in step 506).

Thereafter, control section 104 checks whether or not the predetermined period of time has elapsed after the touch position has been notified so as to determine whether or not the user has released knob 202 (in step 507).

If the predetermined period of time has not elapsed after the touch position has been notified, control section 104 determines that the user has not released knob 202 and returns to step 503. In contrast, if the predetermined period of time has elapsed after the touch position has been notified, control section 104 determines that the user has released knob 202. As a result, control section 104 confirms the setting value (in step 508) and then completes the process.

In the foregoing operation, when the user drags knob 202 horizontally in the rightward direction of slide bar 107, slide bar 107 in which knob 202 has moved to the right appears on display screen 106 as shown in state 403. Thereafter, when the user drags knob 202 vertically in the upward direction of slide bar 107, slide bar 107 in which knob 202 has further moved appears as shown in state 404.

In the foregoing operation, slide bar control section 105 may change the moving direction of knob 202 based on the direction in which the touch position changes. For example, when the touch position is changed in the leftward direction in the first operation, slide bar control section 105 may move knob 202 in the leftward direction. When the touch position is changed in the rightward direction, slide bar control section 105 may move knob 202 in the rightward direction. When the touch position is changed in the upward direction in the second operation, slide bar control section 105 may move knob 202 in the rightward direction. When the touch position is changed in the downward direction in the second operation, knob 202 may move knob 202 in the leftward direction. Alternatively, when the touch position is changed in the upward direction in the second operation, slide bar control section 105 may move knob 202 in the leftward direction. Likewise, when the touch position is changed in the downward direction, slide bar control section 105 may move knob 202 in the rightward direction.

Alternatively, the drag operation and the movement of knob 202 may be synchronously performed in real time. Slide bar control section 105 may display an animation that rotates the knob such that when knob 202 is moved, the nut is rotated through the bolt.

If the user diagonally drags knob 202 to bar 201, control section 104 may determine that the first and second operation have been simultaneously performed and slide bar control section 105 may move knob 202 for the sum of the moving distances of knob 202 corresponding to the horizontal moving distance and the vertical moving distance.

When knob 202 is touched in step 502, the setting value is adjusted. Alternatively, when bar 201 is touched, the setting value may be adjusted. In this case, slide bar control section 105 moves knob 202 to the touch position and then determines whether or not the touch position has been moved.

Next, a specific example of the foregoing operation will be described.

Figure 6:
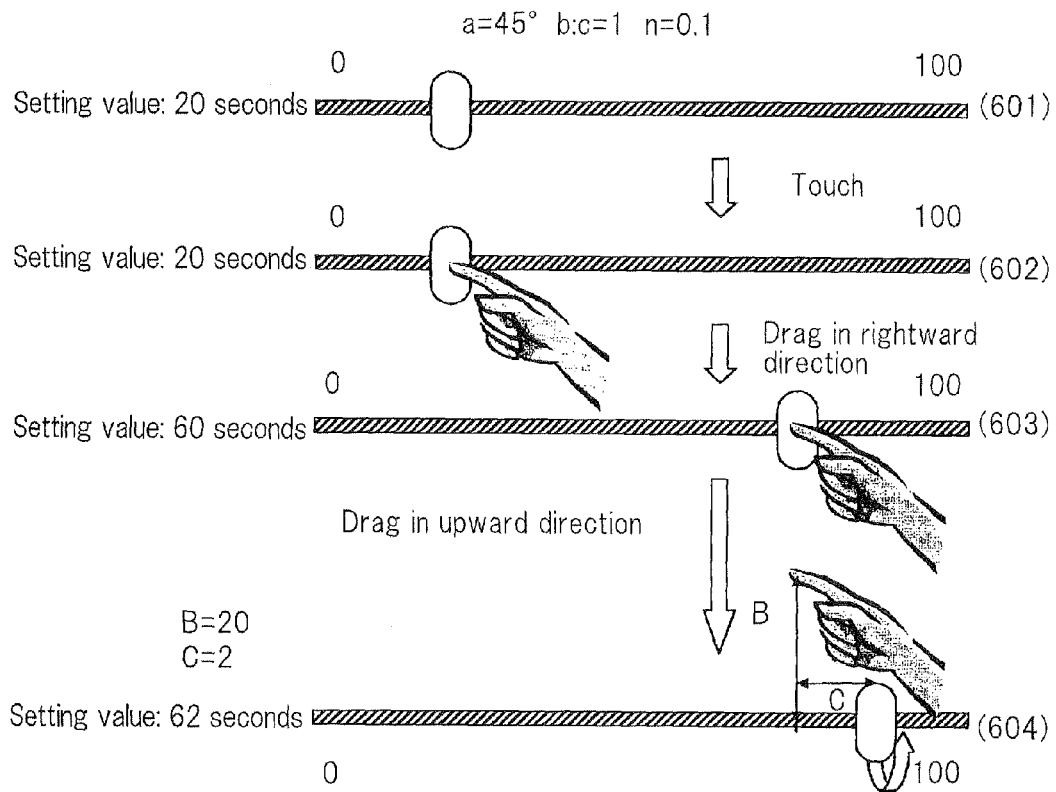
FIG. 6 is a schematic diagram describing a specific example of the operation of the portable terminal.

FIG. 6 is a schematic diagram describing a specific example of the operation of portable terminal 100. In FIG. 6, the setting value is the playback start time of music data. The adjustable range of the setting value is from 0 to 100 seconds. The setting value corresponding to the left end position of slide bar 107 is designated as 0 second; and the setting value corresponding to the right end position of slide bar 107 is designated as 100 seconds. The ratio of the length b in the vertical direction of the hatched lines of slide bar 107 and the length c in the horizontal direction thereof is b:c=1:1. The coefficient n is 0.1. The playback start time corresponding to the drag operation performed in the horizontal direction of slide bar 107 can be adjusted in 10 levels. In other words, the playback start time corresponding to the drag operation performed in the horizontal direction of slide bar 107 can be adjusted at an increment of 10 seconds. The initial value of the playback start time is 20 seconds.

When the user changes the playback start time from 20 seconds to 62 seconds, he or she causes portable terminal 100 to display slide bar 107 (in state 601). Thereafter, the user touches knob 202 on slide bar 107 so as to start adjusting the playback start time (in state 602).

Thereafter, the user performs a drag operation horizontally in the rightward direction of drags slide bar 107 so as to change the playback start time to 60 seconds (in state 603).

Thereafter, the user performs the drag operation vertically in the upward direction of slide bar 107. At this point, when the user performs a drag operation vertically in the upward direction of slide bar 107 for a moving distance for 20 seconds corresponding to the horizontal drag operation of slide bar 107, the moving distance C of knob 202 becomes C=nBc/b=0.1×20×1/1=2. As a result, the playback start time becomes 60+2=62 seconds (in state 604).

In the case that the ratio of the vertical length b and the horizontal length c of the hatched lines of slide bar 107 is b:c=2:1, if the foregoing operation is performed, since the moving distance C of knob 202 in the vertical drag operation becomes C=nBc/b=0.1×20×1/2=2, the setting value becomes 61 seconds.

As described above, according to this embodiment, display and input control section 102 displays on display screen 106 slide bar 107 used to adjust the setting value. In addition, display and input control section 102 detects the touch position at which the touch operation has been performed on display screen 106. Control section 104 detects the first operation that is a drag operation performed in the horizontal direction of slide bar 107 and the second operation that is different from the first operation and that is performed for slide bar 107. Slide bar control section 105 changes the setting value based on the horizontal moving distance that is the moving distance of the touch position of the first operation and the contents of the second operation.

As a result, the user can finely adjust the setting value by the second operation without requiring of another slide bar that is different from slide bar 107. Thus, without much effort, the user can quickly and finely adjust the setting value.

According to this embodiment, the second operation is an operation that moves the touch position in the vertical direction of slide bar 107. Thus, since the user can successively perform the first and second operations without it being necessity to release his or her finger from touch panel 101, he or she can quickly and easily designate his or her desired setting value.

In addition, according to this embodiment, the change rate of the setting value corresponding to the vertical moving distance is smaller than the change rate of the setting value corresponding to the horizontal moving distance. Thus, the user can coarsely adjust the setting value by performing a drag operation in the horizontal direction of slide bar 107 and finely adjust the setting value by performing a drag operation in the vertical direction of slide bar 107.

In addition, according to this embodiment, slide bar 107 depicts hatched lines having an angle tangent to slide bar 107, the angle being proportional to the change rate of the setting value corresponding to the vertical moving amount. In this case, slide bar 107 allows the user to intuitively know the change amount of the setting value corresponding to the vertical moving distance.

Next, another embodiment of the present invention will be described.

According to the first embodiment, the relationship between the vertical moving distance by a drag operation performed in the vertical direction of slide bar 107 and the moving distance (change amount of the setting value) of knob 202 is represented by the slope angle of the hatched lines. Alternatively, the relationship between the vertical moving distance and the moving distance of knob 202 may be represented by another method.

Figure 7:
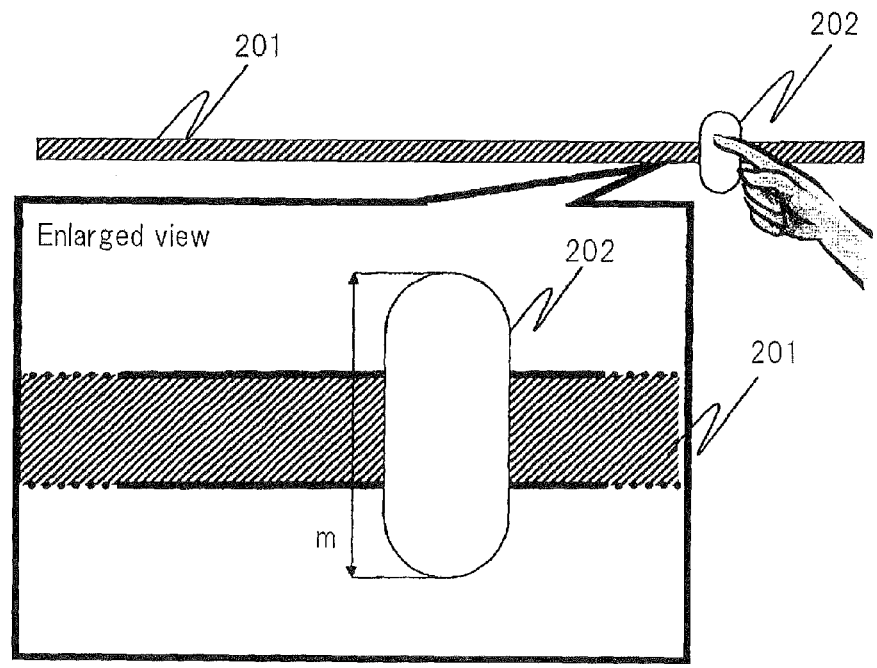
FIG. 7 is a schematic diagram showing another example of the slide bar.

For example, in the case of a real bolt and nut, if the same bolt is used, the amount of the user's operation that rotates the nut one time depends on the outer diameter of the nut. Likewise, as shown in FIG. 7, the size of knob 202 is specified based on the change rate of the moving distance of knob 202 (change rate of the setting value) corresponding to the vertical moving distance.

More specifically, the larger the outer diameter of the nut, the smaller is the number of times that the nut rotates. Thus, the size of knob 202 is reversely proportional to the ratio of the vertical moving distance and the moving distance of knob 202. If the vertical moving distance B and the moving distance C of knob 202 have the relationship of C=nB/m where m is the height of knob 202, the user can intuitively know the change amount of the setting value corresponding to the vertical moving distance.

At this point, slide bar control section 105 may display an animation that rotates knob 202 about a rotation axis of slide bar 107 at a rotation speed proportional to the change rate of the setting value corresponding to the vertical moving amount.

According to the first embodiment, the second operation is a drag operation performed in the vertical direction of slide bar 107 and the contents of the second operation are a vertical moving distance. Alternatively, the second operation and its contents may be other than the drag operation and vertical moving distance.

For example, the second operation may be a click operation or a long pressing operation for bar 201 or knob 202. In this case, slide bar control section 105 may change the setting value based on the number of times of the click operation or the period for which bar 201 or knob 202 is pressed. Alternatively, the second operation may be a flick operation that moves the touch position quickly for a short distance. In this case, for example, slide bar control section 105 changes the setting value based on the moving speed of the touch position in the flick operation.

When the second operation is a drag operation performed in the vertical direction of slide bar 107, slide bar control section 105 may change the setting value based on the moving speed or moving acceleration of the touch position in the vertical direction of slide bar 107 or based on a predetermined combination of the vertical moving distance, moving speed, and moving acceleration instead of changing the setting value corresponding to the vertical moving distance.

For example, slide bar control section 105 may change the setting value based on the product of the vertical moving distance B and the moving speed B'. In this case, the user performs the second operation such that, the faster that the drag operation is executed, the larger will be the change the setting value. Thus, if the adjustable range of the setting value in the second operation is wide, the user may quickly perform the drag operation so as to change the setting value nearly to the desired value and then he or she may slowly perform the drag operation so as to change the setting value to the desired value. As a result, the user can quickly and easily change the setting value to his or her desired value.

Figure 8:
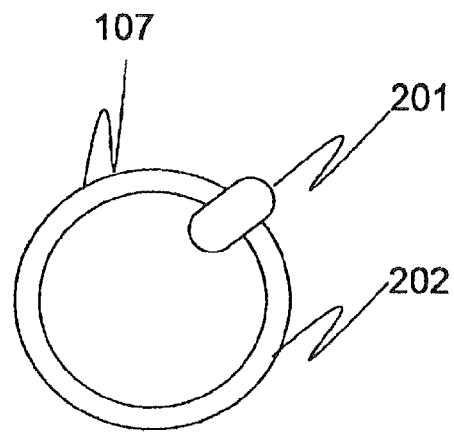
FIG. 8 is a schematic diagram showing another example of the slide bar.
Figure 9:
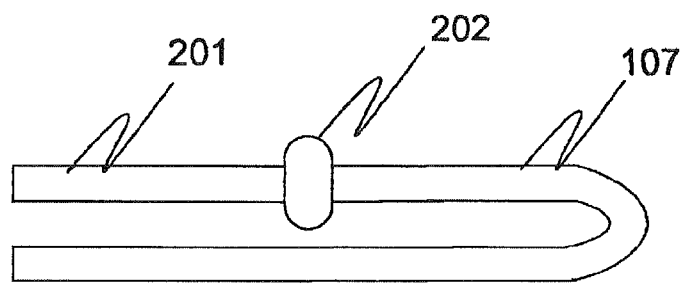
FIG. 9 is a schematic diagram showing another example of the slide bar.
Figure 10:
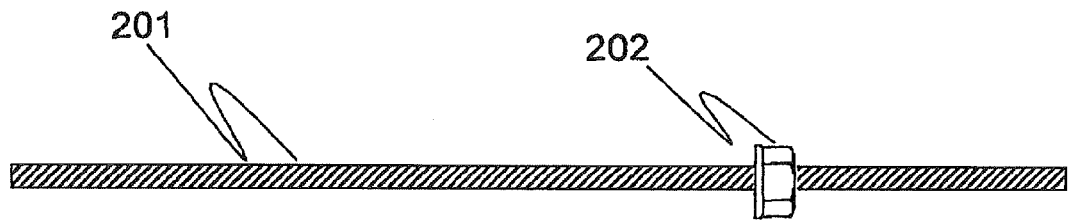
FIG. 10 is a schematic diagram showing another example of the slide bar.

Alternatively, the shape of bar 201 of slide bar 107 may be formed in other than a linear shape. For example, bar 201 may be formed in a circular shape as shown in FIG. 8 or a folded shape as shown in FIG. 9. According to the foregoing embodiment, the shape of knob 202 is formed in an elliptic shape. Alternatively, knob 202 may have a shape close to a side view of a nut as shown in FIG. 10.

According to the foregoing embodiment, the electronic device is not limited to portable terminal 100. In addition, display and input control section 102 may simultaneously display a plurality of slide bars 107 on display screen 106 so as to adjust a plurality of setting values.

According to the foregoing embodiment, the second operation was an operation that moves the touch position to the normal direction of slide bar 107. Alternatively, the second operation is not limited to such an operation.

Normally, it is difficult for the user to strictly perform a drag operation in the horizontal direction or the normal direction of slide bar 107 because he or she manually operates touch panel 101. Thus, even if the touch position has a small angle to slide bar 107, slide bar control section 105 may determine that the operation is a drag operation performed in the horizontal direction or normal direction to slide bar 107.

With reference to the embodiments, the present invention has been described. However, it should be understood by those skilled in the art that the structure and details of the present invention may be changed in various manners without departing from the scope of the present invention.

The present application claims a priority based on Japanese Patent Application JP 2010-138707 filed on Jun. 17, 2010, the entire contents of which are incorporated herein by reference in its entirety.

What is claimed is:

1. An electronic device, comprising:
a display and input section that has a display screen and that accepts a touch operation for said display screen;
a display and input control section that displays a slide bar used to adjust a setting value on said display screen and that detects a touch position at which said touch operation has been performed on said display screen;
a control section that detects a first operation that is a drag operation performed along said slide bar based on the touch position detected by said display and input control section and a second operation that is performed on said display screen, the second operation being different from said first operation; and
a slide bar control section that changes said setting value based on a horizontal moving distance that is a moving distance of said touch position of said first operation and based on contents of said second operation,
wherein said second operation is an operation that moves said touch position to a normal direction of said slide bar,
wherein said contents of said second operation include at least one from among a vertical moving distance that is a moving distance of said touch position in said normal direction, a moving speed of said touch position in said normal direction, and a moving acceleration of said touch position in said normal direction, and
wherein said slide bar depicts hatched lines having an angle tangent to the slide bar, the angle being proportional to the change rate of said setting value corresponding to said vertical moving amount.

2. The electronic device as set forth in claim 1,
wherein a change rate of said setting value corresponding to said vertical moving distance is smaller than a change rate of said setting value corresponding to said horizontal moving distance.

3. The electronic device as set forth in claim 2,
wherein said contents of said second operation are a product of said vertical moving distance and said moving speed.

4. The electronic device as set forth in claim 2,
wherein said slide bar has a knob whose size is proportional to the change rate of said setting value corresponding to said vertical moving amount.

5. The electronic device as set forth in claim 1,
wherein said contents of said second operation are a product of said vertical moving distance and said moving speed.

6. The electronic device as set forth in claim 5,
wherein said slide bar has a knob whose size is proportional to the change rate of said setting value corresponding to said vertical moving amount.

7. The electronic device as set forth in claim 1,
wherein said slide bar has a knob whose size is proportional to the change rate of said setting value corresponding to said vertical moving amount.

8. The electronic device as set forth in claim 7,
wherein said slide bar control section rotates said knob about a rotation axis of said slide bar at a rotation speed proportional to the change rate of said setting value corresponding to said vertical moving amount.

9. The electronic device as set forth in claim 1, wherein said slide bar control section changes directly the setting value based on the horizontal moving distance that is the moving distance of the touch position of the first operation and based on at least one from among the following: the vertical moving distance that is the moving distance of the touch position in the normal direction, the moving speed of the touch position in the normal direction and the moving acceleration of the touch position in the normal direction.

10. An adjustment method for a setting value for an electronic device having a display screen, the adjustment method comprising:

displaying a slide bar used to adjust the setting value on said display screen;

detecting a touch position at which said touch operation has been performed on said display screen;

detecting a first operation that is a drag operation performed along said slide bar on said display screen based on said touch position and a second operation that is performed on said slide bar, the second operation being different from said first operation; and changing said setting value based on a horizontal moving distance that is a moving distance of said touch position of said first operation and based on contents of said second operation, wherein said second operation is an operation that moves said touch position to a normal direction of said slide bar, wherein said contents of said second operation include at least one from among a vertical moving distance that is a moving distance of said touch position in said normal direction, a moving speed of said touch position in said normal direction, and a moving acceleration of said touch position in said normal direction, and wherein said slide bar depicts hatched lines having an angle tangent to the slide bar, the angle being proportional to the change rate of said setting value corresponding to said vertical moving amount.

11. The adjustment method as set forth in claim 10, wherein said changing comprises directly changing the setting value based on the horizontal moving distance that is the moving distance of the touch position of the first operation and based on at least one from among the following: the vertical moving distance that is the moving distance of the touch position in the normal direction, the moving speed of the touch position in the normal direction and the moving acceleration of the touch position in the normal direction.

* * * * *